March 13, 1928.

R. D. BROWNING

HARVESTER THRASHER

Filed April 19, 1926

Inventor
Robert D. Browning
By Edward E. Clement
Attorney

March 13, 1928.

R. D. BROWNING

HARVESTER THRASHER

Filed April 19, 1926

Inventor
Robert D. Browning
Edward E. Clement
Attorney

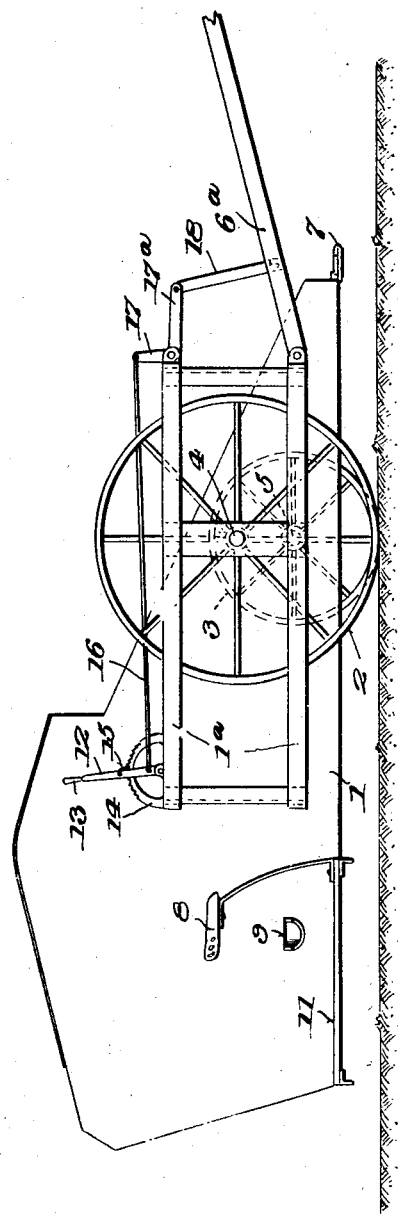

Patented Mar. 13, 1928.

1,662,736

UNITED STATES PATENT OFFICE.

ROBERT D. BROWNING, OF ORANGE, VIRGINIA, ASSIGNOR OF ONE-THIRD TO C. M. CRAFTON, OF ORANGE, VIRGINIA, AND ONE-THIRD TO EDWARD V. BREEDEN, OF GORDONSVILLE, VIRGINIA.

HARVESTER THRASHER.

Application filed April 19, 1926. Serial No. 103,127.

My invention relates to harvesting machines and has for its object the efficient and economical harvesting of crops such as soy beans and the like, with a simple machine requiring small power. Machines heretofore designed for row picking or harvesting, and for broadcast harvesting with incidental thrashing have required large power, but in approaching the problem I have used a different principle, and find that the application thereof has produced improved results, with only a fraction of the power heretofore employed.

Broadly stated, my invention includes a combination such that the grain is cut and then delivered from the cutter to the thrasher attachment, heads first, the thrasher being so related to the elevator and cooperating apparatus that the heads of grain may be thrashed out while the straw is held firmly, and then dropped to be swept out of the machine by a suitable mechanism, while the beans or thrashed out grain fall into the proper channels or conveyors for bagging.

More specifically stated I provide a machine having a frame placed as usual upon the main wheels, (one of which may be a bull wheel), with a cutter bar at the front edge of the receiving table, and back of the cutter bar an elevator of the slat type upon which the grain is laid as it is cut by means of a constantly rotating reel of known construction, heads up, that is to say, heads in the direction of travel. If the crop being harvested is soy beans, the pods will be in a general forward or upward direction with respect to the travel of the elevator. At the upper end of the elevator I provide a cooperating drum or interlocking device which grips the straw or stems as the heads pass up over the end of the elevator, where they are exposed to action of the thrasher rotating downward on the side next the elevator. Beneath the thrasher is a guide upon which the grain and also the straw may fall, and below and to the rear of the thrasher is an undershot conveyor working over slats for carrying and leaving the straw to the rear of the machine, while the grain falls off the guide into a channel below said slats and is carried thereby to the bags. The machine is provided with means under constant control of the driver for elevating or depressing the front ends and the cutters thereof, whereby the driver may avoid damage and delays due to obstructions such as stones or stumps in the path of the machine, and the machine is so constructed that it may be readily adapted to power traction, or to the use of a power take-off from the usual structure.

My invention is illustrated in the accompanying drawings, in which

Figure 2:
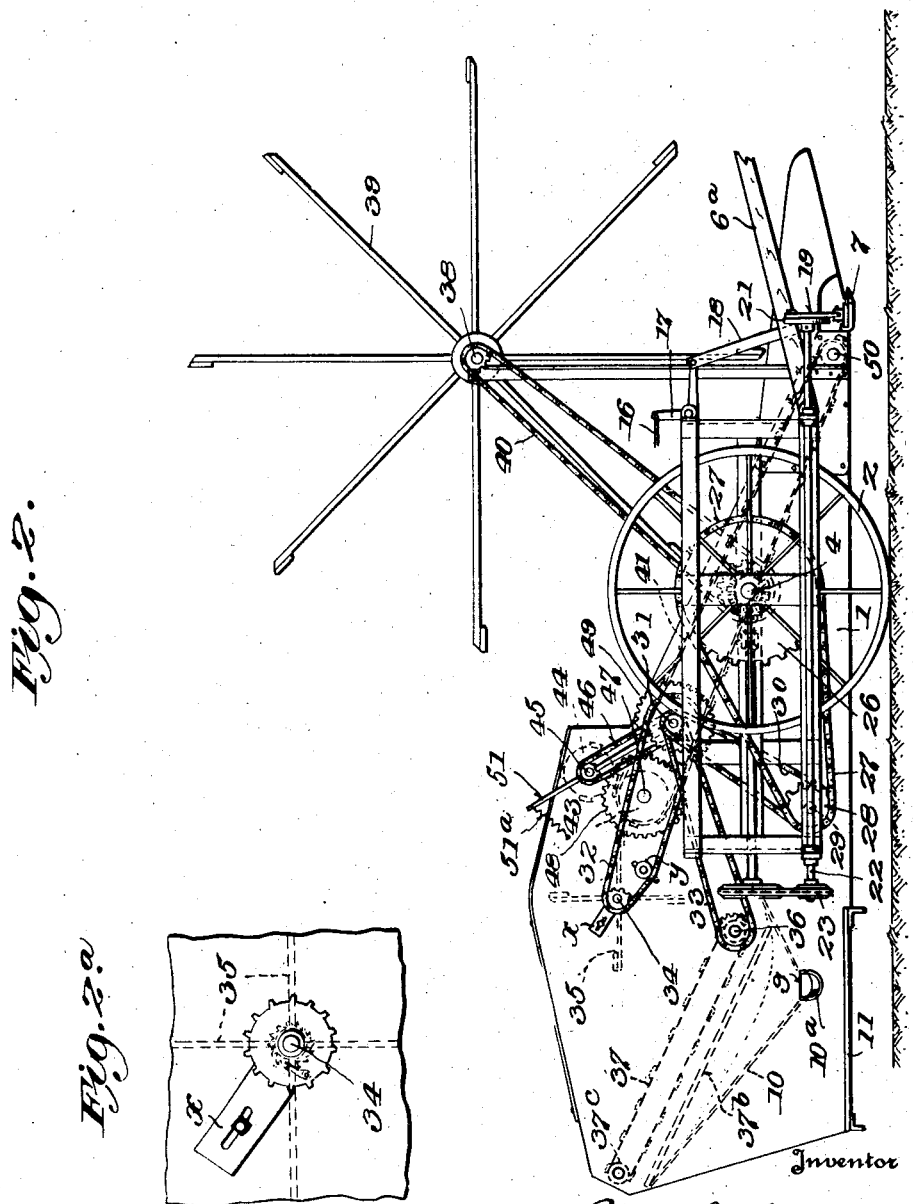
Fig. 2 is a side view thereof looking in the direction of the arrow in Fig. 1.

Fig. 2$^a$ is a detail view of the cheek plate $x$.

Figure 3:
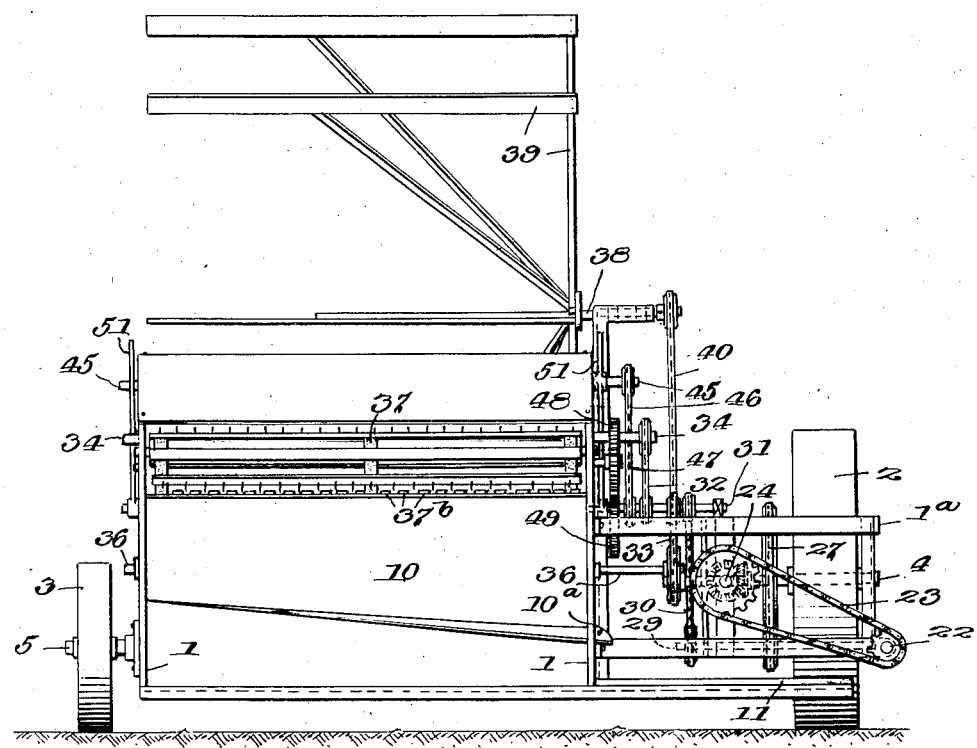

Fig. 3 is a rear end view thereof.

Figure 1:
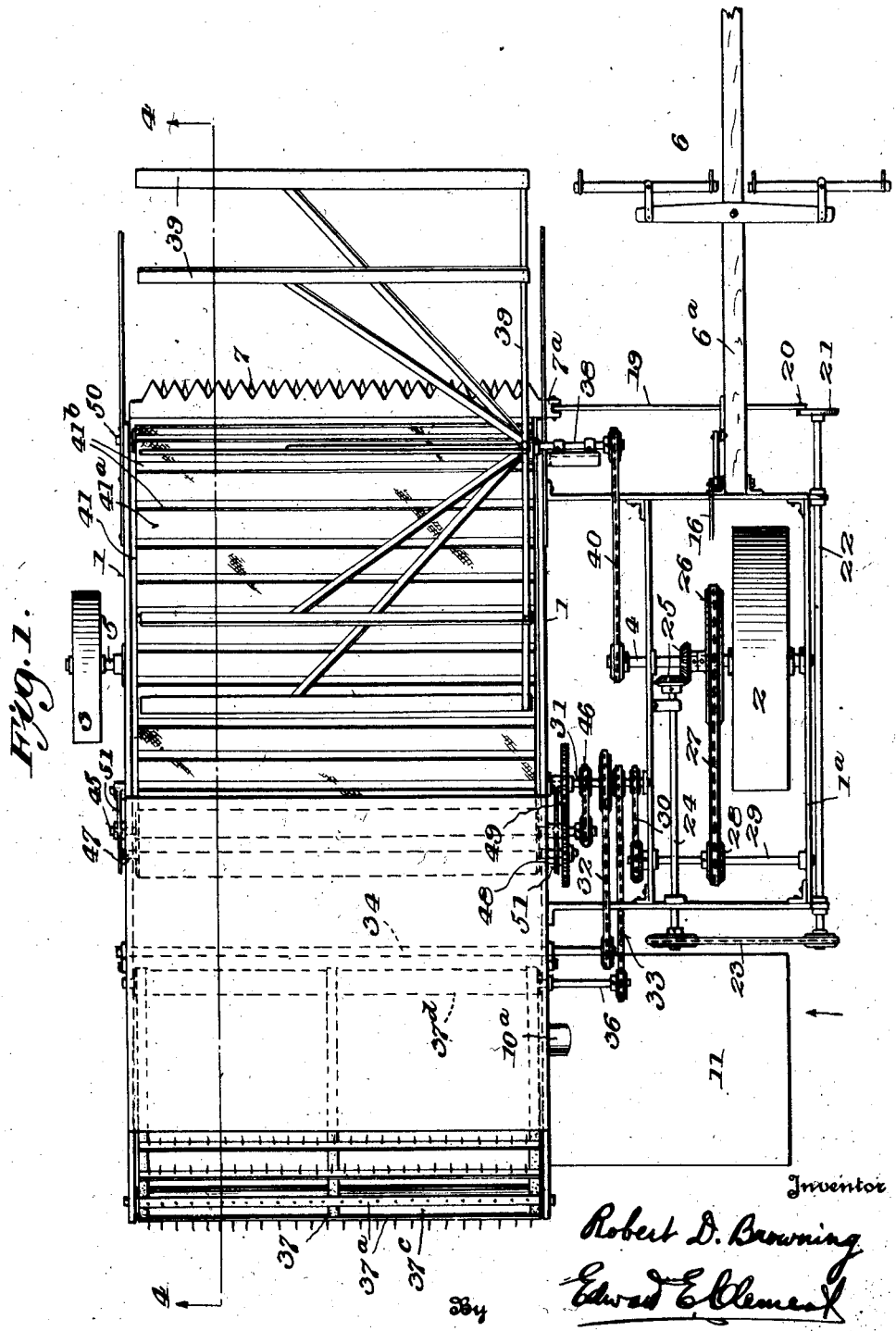
Fig. 1 is a plan view of my improved harvesting machine.

Fig. 4 is a longitudinal vertical section on the line 4—4 of Fig. 1, and

Fig. 5 is a side elevation substantially the same as Fig. 2, but with parts omitted and the side frame covered, also showing the driver's seat and means for controlling the elevation and depression of the front of the machine.

Referring to the drawings, 1 designates in general the frame of the machine which may be of any known or suitable type of construction. 2 is a bull wheel and 3 a companion wheel on axles 4 and 5 which are suitably mounted on opposite sides of the frame. The bull wheel is carried in an outrigger frame 1$^a$ which can be reduced in dimensions if power traction is employed although the most convenient form of gearing is that used in Figs. 1, 2 and 3. Traction as herein assumed is by means of draft rigging 6 to which one or more teams of horses are supposed to be hitched as usual. The pole 6$^a$ may also symbolize a draft link or other connection from my machine to a tractor, provided in every case that the balance of the machine on its wheels 2—3, and the distance of the cutter bars 7 from the ground is determined with reference to said pole or draft connection 6$^a$. The manner of effecting this adjustment is best shown in Fig. 5 wherein the driver occupies a seat 8 to one side and forward of the grain spout 9 opening from the channel conveyor 10 on to the bagging platform 11. In front of the driver's position, and mounted on the outrigger frame 1$^a$ is a pivoted lever 12 with a handle 13 and a ratchet arc 14 receiving a pawl 15 on the lever, which is connected by a forward extended link 16 to the bell-crank 17 whose horizontal arm 17$^a$ is connected by link 18 to the pole or tractor bar 6ᵃ. By adjusting the lever 12 on the arc 14, the operator at 8 may raise and lower the front end of the machine and the cutter bar 7 with respect to the element 6ᵃ and also the ground.

Returning to Fig. 1, and reading the same in connection with Figs. 2 and 3, the cutter bar 7 are mounted on and across the front of the machine for mutual reciprocatory motion, the upper bar 7ᵃ (see Fig. 1) being connected by link 19 to a raised pin 20 on the crank disc 21 carried on shaft 22 driven through chain and sprocket gears 23 from a power take-off shaft 24 driven through bevel gears 25 from the main shaft 4 of the bull wheel 2 or equivalent power take-off. As the shaft 4 turns, through the system of bevel gearing thus described the upper cutter bar 7ᵃ reciprocates with respect to the lower one and cutting is effected as usual. Also fixed on the main shaft 4 is a sprocket 26 which drives the chain 27 communicating power to a sprocket 28 on jack shaft 29 which through sprocket and chain connection 30 drives a countershaft 31 which by means of sprocket and chain drive 32 communicates power to the shaft 35 and thence by a forward ratchet connection to the thrasher 35, and by drive 33 similarly communicates power to the shaft 36 of the straw or trash conveyor 37 (see Figs. 1, 2 and 4). Mounted on a transverse shaft 38 on the front of the machine is a reel 39 of known construction, driven by sprocket and chain connection 40 off the main shaft 4. This reel may be adjustable for crops of different height and to meet other variable conditions, as known in the art. The purpose of this reel is to move the grain or vines up to the cutters, and lay the stalks flat on the conveyor or elevator 41 whereby they are carried heads up to the thrasher 35 (see Fig. 4). The conveyor 41 is shown in dotted lines in Fig. 2, in full lines in plan in Fig. 1, and in solid lines in section in Fig. 4. For reasons which will presently appear, it is necessary that the action of the elevator conveyor 41, the presser drum 44 and the thrasher 35 should be properly interrelated, hence I drive the elevator, the thrasher and the presser drum all from the shaft 31 which in turn derives its power through the chain drive 30 from the countershaft 29, etc. This connection is best shown in Fig. 2 where the shaft 45 of the presser drum 44 is driven by chain and sprocket connection 46 from the shaft 31; the thrasher shaft 34 is driven at high speed as for example 400 revolutions per minute, more or less by chain 32 from shaft 31; the upper or drive roll 43 of the elevator 41 is connected through gears 48—49 to the shaft 31 and the lower drum 50 of the elevator 41 is turned as an idler by the travel of the canvass belt 41ᵃ carrying the transverse slats 41ᵇ. The speed of the thrasher is necessarily very much higher than the speed of travel of the conveyor 41 and its pressure drum 44, and this speed may be varied according to the character of the grain to be thrashed. As shown in Fig. 2ᵃ the thrasher 35 is driven from shaft 34 by means of a ratchet keyed on the shaft and a pawl carried on the sprocket wheel which turns loosely on shaft 34. By this means when the power drive stops the thrasher can continue to turn, which it does at high speed. It is also to be noted that the thrasher shaft bearings are carried in adjustable cheek plates $x$ (Fig. 2ᵃ) by which means the entire thrasher can be adjusted toward and away from the elevator drive roll 43, so as to accommodate different crops. The chain 32 is kept taut by means of an adjustable idler wheel $y$. The transverse presser drum 44 lies just above the elevator roll 43, and is adjustable with respect to the latter. For convenience, and also because its distance from the center of the thrasher should be maintained constant, the bearings of the shaft 45 are carried in levers 51 both pivoted on the ends of the shaft 31, from which shaft the presser drum is also driven, as heretofore stated. This gives a radial adjustment with constant drive of the presser drum 44 around the shaft 31, and to and from the upper service of the elevator 41 where it passes over its drive roll 43, in constant parallelism with the shaft 47 thereof. The presser drum is maintained under tension downwardly toward the guide roll 43 by means of springs 51ᵃ applied to one or both of the radial carriers 51. This drum carries slats or longitudinal corrugations 44ᵃ which are adjusted so that in rotation they always come between the slats 41ᵇ on the elevator 41. Thus as the cut grain is brought up, with heads forward, it passes under the drum 44 heads first, and the straw is tightly held between the corrugations or slats 44ᵃ and 41ᵇ, while the heads project over into the path of travel of the thrasher arms 35 and the grain is thrashed out downwardly in the direction of the arrow, in Fig. 4. The operation of the thrasher, elevator, presser drum, trash conveyor and bagging channels, is best shown in Fig. 4, to which reference may be had for a complete understanding thereof.

Referring to Fig. 4 the cutter 7 meets and severs the stems of the grain or bean plants or the like, while the reel 39 rotating in the direction of the arrow, lays the severed plants or straw stems upon the elevator conveyor 41, heads up. The motion of this elevator is in the direction of the arrow, and as the broad canvass belt is carried up around the drum 43 it produces a continuous feed of continuously overlapping plants or stems, with heads or pods up, that is to say, always in the direction of travel. As the successive layers reach the upper part of the elevator over the drum 43 they are engaged by the presser drum 44, which is permitted to rise and fall by the spring 51ᵃ, so as to accommodate itself to varying thicknesses in the layers of grain and straw which pass under it. Its slats 44ᵃ however produce a constant tension between the slats 41ᵇ of the elevator, and thereby maintain a strong grip upon the product as it is being fed over the drum 43 to the thrasher 35. Thus, there is a continuous progression of grain heads or pods projecting from over the drum 43 into the path of travel of the thrasher blades 35, which rotate in the direction of the arrow 35ᵃ. Below the thrasher a curved guide 35ᶜ is provided, and it may be stated at once that the grain or beans thrashed out fall down upon this guide and are carried through between the slats 37ᵇ into the bagging trough 10 which has an outlet spout 10ᵃ as shown in Fig. 2. This trough is also shown in Fig. 3 and extends completely across the machine with sufficient drop so that the grain will pass by gravity to the bagging platform. As an alternative, I may provide this trough or channel with any desired form of feed device such as a helical conveyor or screw rotated from one of the power shafts and keeping the grain or bean constantly moving in the trough toward the spout 10ᵃ.

The slats 37ᵇ to which reference has been made extend longitudinally on the machine, parallel to each other, and beneath the trash conveyor 37 as best shown in Figs. 2 and 4. They are set far enough apart so that the grain or beans may pass between them, and close enough together so that the trash will not pass. The straw coming from the drums 43—44 is fed out and carried down over the guide 35ᶜ to the slats 37ᵇ, over which it is drawn bodily and swept out of the machine by the constant travel of the trash conveyor 37 which may comprise a canvass or other flexible band the width of the machine, carrying slats 37ᵃ fitted with projecting points or studs. This is an "under-shot" conveyor, that is to say, it travels in the direction of the arrow 37ᵈ, and draws the trash along beneath it until it passes off the slats at their ends 37ᵉ and is expelled from the machine.

I am aware that there may be many changes and modifications made in matters of detail in this machine without departing from the spirit of the invention. I wish it distinctly understood that all such changes and modifications are fairly included within the scope of the appended claims. For example by disconnecting the bull wheel and hooking up some other driving power, such as a gas engine or an electric motor, this machine can be used as a stationary thrasher. Thus, where on a small farm it might not pay to operate a combined harvester and thrasher, this machine can back up to the door, and thrash the crop which has been cut with scythes and is thrown by hand on the elevator 41.

What I claim is:

1. In a combined harvesting and thrashing machine, the combination of a wheel supported main frame, a reel journalled transversely on said main frame at the front end thereof, cutting mechanism across the front end of the frame, an elevator conveyor extending from a point adjacent to said cutting mechanism to the upper rear portion of the frame, a pressure drum with means adapted to maintain the same pressed downward the rearwardly moving end of the elevator, means to drive said elevator and said pressure drum at the same peripheral speed, to move together, whereby grain laid thereon by the reel with the heads or pods rearwardly will be held by the combined motion of the elevator and the pressure drum with the said heads or pods extended while the stems thereof are held tightly when the end of the elevator is reached, and a thrasher journalled beyond said pressure drum and elevator and adapted to beat the grain out of the extended heads or pods while thus held into an open space beneath the thrasher whereby the grain and straw after beating may fall continuously away from the beater.

2. The combined harvesting and thrashing machine claimed in claim 1, in which the thrasher is composed of flailing arms or beaters rotated in such a direction as to produce a downward movement of the beaten out grain, and a transverse guide or pan beneath the thrasher receives said grain.

3. The combined harvesting and thrashing machine claimed in claim 1, in which the thrasher has flailing arms rotated in a direction to produce downward movement of the beaten out grain, and a guide or pan is located beneath the thrasher adapted to direct said grain into a channel conveyor adapted to carry the same out of the machine for bagging.

4. The combined harvesting and thrashing machine claimed in claim 1, in which the thrasher has flailing arms rotated so as to produce downward movement of the beaten out grain in a free space, a guide and receiving means for said grain beneath said space, means for separating said grain from the straw and trash falling upon said guide, and means for separately conveying away and ejecting said straw and trash.

5. The combined harvesting and thrashing machine claimed in claim 1, having a rotary thrasher with flailing arms acting to produce downward motion of the beaten out grain into an open space, a guide for said grain beneath the thrasher, a separator for trash projecting beneath the said guide and extending thence to a discharge opening at the rear of the machine, and a conveyor above said separator adapted to take the straw and trash from the guide and move it along said separator to the said discharge opening.

6. The combined harvesting and thrashing machine claimed in claim 1, having means permitting the position of the pressure drum with respect to the elevator, to vary in accordance with the thickness of the masses of grain and stalks passing between them.

7. In a combined harvesting and thrashing machine, means for cutting the grain, means for continuously laying the same after cutting with the heads or pods to the rear, means for conveying the same in this position continuously to a thrashing point removed from the cutting point, means at said thrashing point for gripping and holding the stalks and grass of the grain or beans to be thrashed with the heads projecting therefrom, and thrashing means beyond said holding means thereupon acting to beat out the grain from the heads or pods into an open space.

8. The combined harvesting and thrashing machine claimed in claim 7, in which the thrashing means acts to forcibly drive the grain beaten out through an open space toward the ejection channel of the machine.

9. The combined harvesting and thrashing machine claimed in claim 7, having the thrashing means forcibly driving the beaten out grain through an open space toward the ejection channel of the machine, with means interposed between the thrasher and said channel to clean the grain and to remove the stalks and trash therefrom.

10. In a combined harvesting and thrashing machine, a cutter, an elevator, a reel, a pressure drum, a thrasher, and a trash removing conveyor, together with a main shaft power driven, and gears and connecting chains for all of said members, whereby the cutters are driven continuously to cut the grain, the reel is driven with its undershot movement in the direction of the rear of the machine to lay the grain on the elevator, heads to the rear, the elevator is driven to carry the grain to the pressure drum, the pressure drum is driven synchronously with and at the same peripheral speed as the upper feed reel of the elevator so as to grip the stalks or plants of the grain firmly between them, the thrasher is driven with flailing arms traveling downwardly across the upper end of the elevator, to drive the grain through an open space beneath the thrasher toward the ejection opening of the machine, while the stalks are securely held by the pressure drum, and the trash separator or conveyor is driven to move the straws and trash continuously away from beneath the thrasher to discharge it at the rear of the machine.

11. In a combined harvesting and thrashing machine, a combination of a forward cutting mechanism, a rearward moving elevator and conveyor, means to lay the grain as it is cut on said elevator with heads or pods to the rear, means to hold the same in said position as it passes over the upper and rearward end of the elevator, and independent means to thrash out the grain from said heads while the same and the stalks or plants are held.

12. A combined harvesting and thrashing machine comprising a forward cutting mechanism and a rearwardly extending elevator or conveyor, means to lay the grain when cut on said conveyor with heads or pods to the rear, means to produce continuous motion of said elevator to carry the grain in such position toward the rear, a pressure drum at the upper rearward end of said conveyor or elevator having peripheral speed of rotation the same as that of said conveyor, means to maintain pressure on said pressure drum toward the elevator, whereby the stalks of the grain will be gripped and held firmly on the upper end thereof, and means to flail out the grain from the heads or pods as they project in succession over and beyond the end of the elevator.

13. The combined harvesting and thrashing machine claimed in claim 12, in which the means to flail out the grain is a rotary thrasher or beater rotating at a much higher speed than the conveyor and pressure drum, whereby each advancing portion of the grain as it passes beyond the end of the conveyor and pressure drum is repeatedly flailed or beaten and the grain or straw forcibly driven and blown toward the ejection openings of the machine.

14. The combined harvesting and thrashing machine claimed in claim 12, in which the pressure drum is provided with longitudinal slats or corrugations set at intervals around its cylindrical periphery, and a conveyor or elevator has transverse slats or corrugations along its surface at identical intervals, and the gearing of the two parts is so set that the slats of the drum and the slats on the conveyor will alternate and intermesh at all times, irrespective of their speed.

15. In a combined harvesting and thrashing machine as claimed in claim 12, a guide or pan receiving the grain and straw from the thrasher, and a sieve extending from said guide or pan to an ejection opening in the machine, said sieve composed of slats extending longitudinally of the frame and parallel to each other, with means beneath them for receiving the grain, and means above them for carrying away the trash on their surface longitudinally of the slats.

In testimony whereof I hereunto affix my signature.

ROBT. D. BROWNING.